April 24, 1934.    F. J. RAYBOULD    1,955,830
CONNECTER
Original Filed April 18, 1931
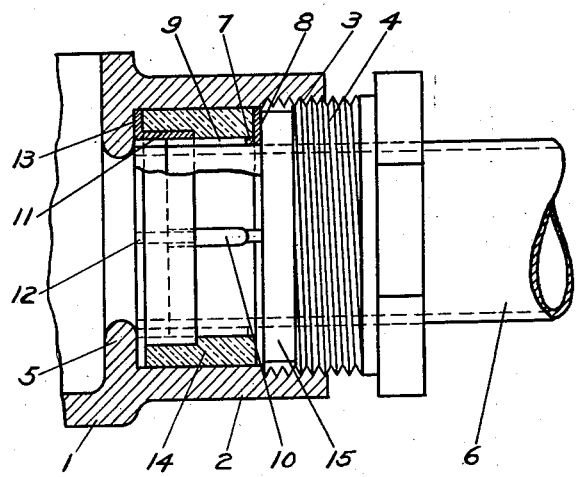
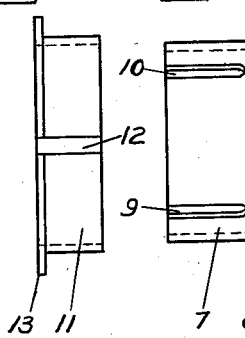 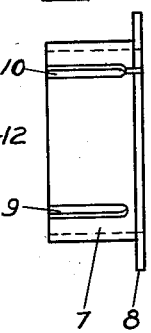
INVENTOR.
Frank J. Raybould
BY
ATTORNEYS.

Patented Apr. 24, 1934

1,955,830

UNITED STATES PATENT OFFICE 1,955,830

CONNECTER

Frank J. Raybould, Erie, Pa.

Application April 18, 1931, Serial No. 531,148
Renewed June 9, 1933

10 Claims. (Cl. 285—166)

The present invention is designed to improve threadless connecters. Many of such connections are subjected to very severe strains and in many situations, such as with thin walled conduit difficulty is experienced in getting sufficient engagement of the conduit to resist the strains to which the conduit is sometimes subjected. Where the conduit is used for electric conductors it is also desirable to assure electrical connection between the parts of the connecter so that accidental shorts may be obviated. Features and details of the invention will appear from the specification and claims.

A preferred embodiment of my invention is illustrated in the accompanying drawing as follows:—

Fig. 1 shows a central section through a connecter fitting.

Fig. 2 an elevation of one of the locking sleeves.

Fig. 3 an elevation of another locking sleeve.

1 marks the fitting which, as shown, is a conduit box. This is provided with an extension 2 having internal screw threads 3 at its outer end. A screw-threaded sleeve 4 operates in the screw threads 3 and exerts endwise pressure on the parts within the extension. The inner end of the extension is provided with a guard shoulder 5 and a conduit 6 extends into the extension to the guard shoulder.

The locking devices comprise telescoping rings, the inner of these rings 7 is provided with an outwardly extending flange 8 and slits 9 in the cylindrical portion. The sleeve is preferably transversely split at 10. The companion sleeve 11 is preferably transversely split at 12 and is provided with an out-turned flange 13, the flange 13 engaging the guard shoulder 5 and the end of the screw-threaded sleeve 4 engaging the flange 8. A tubular wall 14 is arranged around the telescoping sleeves 7 and 11 and between the flanges 8 and 13 and is confined in the space between the telescoping sleeves and the wall of the extension and the flanges. The screw-threaded sleeve 4 has a cylindrical extension 15 so that as the screw-threaded sleeve is screwed up this cylindrical portion follows into the extension forcing the telescoping sleeves together and distorting the wall 14, reducing its axial dimension and increasing its radial dimension. The wall 14, therefore, exerts a radial pressure on the telescoping sleeves and in consequence upon the conduit corresponding in force to the axial pressure delivered on the distortable material by the screw-threaded sleeve.

With this structure a uniform gripping action without localized strains can be exerted upon the conduit and in consequence a clamping pressure exerted of sufficient force to hold the conduit against separation from the fitting even though subjected to very great stress, the connection in this respect being very much more efficient than those now in common use.

While I have shown my connecter as adapted to a conduit fitting, I do not wish to be limited to this adaptation except in as far as the claims may be limited thereto.

What I claim as new is:—

1. In a connecter, the combination of two members to be connected, one of which is tubular and the other an inner member within the tubular member; a locking device comprising telescoping sleeves engaging one of the members and a bodily distortable wall between the sleeves and the opposing member; and means confining and exerting a distorting pressure on the wall bodily reducing it in some dimensions and expanding it between the sleeves and the opposing member.

2. In a connecter, the combination of two members to be connected, one of which is tubular and the other an inner member within the tubular member; a locking device comprising telescoping sleeves surrounding and engaging the inner member and a bodily distortable wall between the sleeves and the outer member; and means confining and exerting a distorting pressure on the wall bodily reducing it in some dimensions and expanding it between the telescoping sleeves and the outer member.

3. In a connecter, the combination of two members to be connected, one of which is tubular and the other an inner member within the tubular member; a locking device comprising telescoping contractible sleeves engaging one of the members and a bodily distortable wall between the sleeves and the opposing member; and means confining and exerting a distorting pressure on the wall bodily reducing it in some dimensions and expanding it between the sleeves and the opposing member.

4. In a connecter, the combination of two members to be connected, one of which is tubular and the other an inner member within the tubular member; a locking device comprising telescoping sleeves engaging one of the members, one of said sleeves having a flange at its free end; a bodily distortable wall between the sleeves and the opposing member; and means confining and exerting a distorting pressure on the wall through the flange bodily reducing it in some dimensions and expanding it between the sleeves and the opposing member.

5. In a connecter, the combination of two members to be connected, one of which is tubular and the other an inner member within the tubular member; a locking device comprising telescoping sleeves engaging one of the members, both of said sleeves having flanges at their free ends; a bodily distortable wall between the sleeves and the opposing member and between the flanges; and means confining and exerting a distorting pressure on the wall through the flanges bodily reducing it in some dimensions and expanding it between the sleeves and the opposing member.

6. In a connecter, the combination of two members to be connected, one of which is tubular and the other an inner member within the tubular member; a locking device comprising telescoping sleeves surrounding and engaging the inner member, one of the sleeves having a flange at its free end; a bodily distortable wall between the sleeves and the outer member; and means confining and exerting a distorting pressure through the flange on the wall bodily reducing it in some dimensions and expanding it between the sleeves and the opposing member.

7. In a connecter, the combination of two members to be connected, one of which is tubular and the other an inner member within the tubular member; a locking device comprising telescoping sleeves surrounding and engaging the inner member, both of said sleeves having flanges at their free ends; a bodily distortable wall between the sleeves and the opposing member and between the flanges; and means confining and exerting distorting pressure through the flanges on the wall bodily reducing it in some dimensions and expanding it between the sleeves and the opposing member.

8. In a fitting, the combination of a body having an internally screw-threaded extension and a shoulder; a screw-threaded sleeve in the extension; telescoping sleeves in the extension, one of which is engaged by the screw-threaded sleeve; and a wall of distortable material around the telescoping sleeves and engaging the wall of the extension.

9. In a fitting, the combination of a body having an internally screw-threaded extension and a shoulder; a screw-threaded sleeve in the extension; telescoping sleeves in the extension, one of which has a flange engaged by the screw-threaded sleeve; and a wall of distortable material around the telescoping sleeves engaging the wall of the extension.

10. In a fitting, the combination of a body having an internally screw-threaded extension and a shoulder; a screw-threaded sleeve in the extension; telescoping sleeves in the extension, both of said sleeves having flanges, one of which is engaged by the screw-threaded sleeve; and a wall of distortable material around the telescoping sleeves engaging the wall of the extension.

FRANK J. RAYBOULD.